US006985253B2

(12) United States Patent
Figueroa et al.

(10) Patent No.: US 6,985,253 B2
(45) Date of Patent: Jan. 10, 2006

(54) PROCESSING FILM IMAGES FOR DIGITAL CINEMA

(75) Inventors: Ricardo R. Figueroa, Walworth, NY (US); Thomas O. Maier, Rochester, NY (US); John C. Brewer, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 746 days.

(21) Appl. No.: 09/751,230

(22) Filed: Dec. 28, 2000

(65) Prior Publication Data

US 2002/0118211 A1 Aug. 29, 2002

(51) Int. Cl.
*G06F 15/00* (2006.01)
*H02N 1/46* (2006.01)
*H02N 3/36* (2006.01)

(52) U.S. Cl. .......................... 358/1.9; 358/506; 348/97
(58) Field of Classification Search ................ 358/506, 358/505, 302, 1.9, 527, 518, 523; 382/162, 382/167; 348/577, 239, 104, 588, 96, 97; 386/38, 114; 430/359, 496; 355/32; 375/240.01
See application file for complete search history.

(56) References Cited

U.S. PATENT DOCUMENTS

| | | | | | |
|---|---|---|---|---|---|
| 4,710,806 | A | * | 12/1987 | Iwai et al. ............. | 375/240.01 |
| 4,771,342 | A | * | 9/1988 | Beesley ...................... | 386/114 |
| 4,839,721 | A | | 6/1989 | Abdulwahab et al. | |
| 4,866,513 | A | * | 9/1989 | Takahashi ................... | 358/506 |
| 5,060,061 | A | * | 10/1991 | Shishido et al. ............ | 358/506 |
| 5,140,414 | A | * | 8/1992 | Mowry ....................... | 348/577 |
| 5,157,506 | A | * | 10/1992 | Hannah ....................... | 382/167 |
| 5,185,666 | A | * | 2/1993 | Capitant et al. ............ | 348/588 |
| 5,239,370 | A | | 8/1993 | Yamaguchi | |
| 5,319,465 | A | * | 6/1994 | Squyres et al. ............... | 386/38 |
| 5,457,491 | A | * | 10/1995 | Mowry ........................ | 348/104 |
| 5,667,944 | A | * | 9/1997 | Reem et al. ................. | 430/359 |
| 5,687,011 | A | | 11/1997 | Mowry | |
| 5,809,164 | A | | 9/1998 | Hultgren, III | |
| 5,831,673 | A | * | 11/1998 | Przyborski et al. ......... | 348/239 |
| 5,891,607 | A | * | 4/1999 | Brewer et al. .............. | 430/383 |
| 5,909,291 | A | | 6/1999 | Myers et al. | |

(Continued)

FOREIGN PATENT DOCUMENTS

WO  WO 00/64191  10/2000

OTHER PUBLICATIONS

Pytlak and Fleischer, "A Simplified Motion-Picture Laboratory Control Method for Improved Color Duplication", SMPTE Journal, Oct. 1976, vol. 85, No. 10, pp. 781-785.

(Continued)

*Primary Examiner*—Madeleine Nguyen
(74) *Attorney, Agent, or Firm*—Susan L. Parulski

(57) ABSTRACT

Scanner density values of a digitized image of an original film are processed so that a projection of the digitized image closely matches that image which a film projector would produce when projecting the original film. A method comprises the steps of transforming the scanner density values to printing density values; digital color balancing by writing the printing density values and a LAD patch onto film; printing the film is printed to LAD; transforming the images from device dependent color space values into device independent color space values; carrying out a relationship between the device independent color space and a display device output to obtain RGB code values; adjusting any non-linearity between the RGB code values and the display device output; and scaling the adjusted RGB code values to an appropriate bit depth.

28 Claims, 3 Drawing Sheets

U.S. PATENT DOCUMENTS

| | | | |
|---|---|---|---|
| 5,917,987 A | | 6/1999 | Neyman |
| 6,115,062 A | * | 9/2000 | Milson et al. ............... 348/96 |
| 6,292,617 B1 | * | 9/2001 | Neyman ..................... 386/42 |
| 6,424,740 B1 | * | 7/2002 | Giorgianni et al. ......... 382/167 |
| 6,498,638 B1 | * | 12/2002 | Zolliker et al. .............. 355/32 |
| 6,742,869 B2 | * | 6/2004 | Redding et al. ............. 347/43 |
| 6,751,346 B2 | * | 6/2004 | Shimizu .................... 382/162 |
| 6,825,876 B1 | * | 11/2004 | Easwar et al. ............. 348/234 |
| 6,864,915 B1 | * | 3/2005 | Guimaraes et al. ...... 348/222.1 |
| 6,886,932 B2 | * | 5/2005 | Rudolph .................... 347/100 |
| 2001/0053247 A1 | * | 12/2001 | Sowinski et al. |
| 2002/0057460 A1 | * | 5/2002 | Shiota et al. |
| 2002/0163657 A1 | * | 11/2002 | Bogdanowicz et al. |
| 2002/0163676 A1 | * | 11/2002 | Jones et al. |

OTHER PUBLICATIONS

Giorgianni and Madden, *Digital Color Managment Encoding Solutions*, pp. 448-488.

Kennel and Snider, "Gray-Scale Transformations of Digital Film Data for Display, Conversion, and Film Recording" in the SMPTE Journal, vol. 102, Dec. 1993, pp. 1109-1119.

*EASTMAN Professional Motion Picture Films*, Kodak Publication No. H-1 (CAT 155 2280, 12-92-E Major Revision, Library of Congress Catalog Card No. 91-77432, ISBN 0-87985-477-4), pp. 80-90.

*The Theory of the Photographic Process*, Forth Edition, pp. 517-535.

Roberts and Eng, "Television Colorimetry: A tutorial for system designers", Research and Development Report, 1995, pp. 1-14.

Markandey, Clatanoff and Pettitt, "Video Processing for DLP Display Systems", SPIE Proceedings—vol. 2666, pp. 21-32.

* cited by examiner

PROCESSING FILM IMAGES FOR DIGITAL CINEMA

FIELD OF THE INVENTION

The present invention relates to the field of digital image processing. More specifically, it relates to the digital tone scale and color processing of negative or positive film images that have been digitized. This tone scale and color processing is optimized such that the digital images, when projected on a digital projector, match the colorimetry or appearance that a film projector would produce when projecting the motion picture print from the originating film.

BACKGROUND OF THE INVENTION

With the arrival of digital cinema, the necessity grows to achieve a high quality imaging system for consumers. The public has become accustomed to the traditional "film look" that they see when going to the movie theater. With digital cinema, digital projectors need to produce an image on the screen that preserves that "film look" since it is a pleasing and widely accepted look. After obtaining a digital image by scanning a motion picture film, the process of transforming the digital data, so that it has the "film-look" when it is projected on a digital projector, is a very tedious, costly and time-consuming process carried out by professionals known as colorists.

U.S. Pat. Nos. 5,809,164 and 5,239,370 disclose color management systems for emulating the "film-look" by focusing on gamut mapping or compression. Both patents assume that the capturing device has spectral sensitivities that are linear combinations of the CIE 2° Color Matching Functions. U.S. Pat. No. 4,839,721 states that the transformation between the capture medium and the selected color space is performed with a substantially linearized response of the capture medium to the selected color space. It would be an advantage if the spectral sensitivities or response of the capturing device do not need to be a linear combination of the CIE 2° Color Matching Functions or of the selected color space.

U.S. Pat. No. 5,687,011 discloses a system in which a video image and a film image are simultaneously captured, and a computer reassigns color component data based on digital data representative of color component data within the image recorded on film. This is an impractical approach because of the necessity of having to concurrently record a film and a video image. It would be an advantage if there were no need to capture the scene on video to be able to do the transformation of the digital data to match film projection results.

U.S. Pat. No. 5,909,291 discloses a color matching system that initializes a translator by storing profiles of source and destination color devices which include the coordinates in a calibrated color space of the colorants produced in the source and destination devices and a tonal reproduction curve for each device. It would be an advantage if it were not necessary to store any profiles from source or destination devices.

At the present time, professionals known as colorists spend a great amount of time empirically varying the tone scale and color of digitized film images to match, on a digital projector, the look that a film projector would have produced for the same material. A robust, straightforward method is needed that transforms film-originated and scanned digital images for digital projection so that the projected images emulate film projected images while, at the same time, eliminating the need for any manual adjustments to the color and tone scale of digitized images after the originating film has been adjusted for color and tone to create an acceptable release print.

DISCLOSURE OF THE INVENTION

It is an object of the present invention to provide digital image processing wherein the spectral sensitivities or response of the capturing device do not need to be a linear combination of the CIE 2° Color Matching Functions or of the selected color space.

It is another object of the present invention to provide digital image processing wherein there is no need to capture the scene on video to be able to do the transformation of the digital data to match film projection results.

It is another object of the present invention to provide digital image processing wherein it is unnecessary to store any profiles from source or destination devices.

It is another object of the present invention to provide digital image processing that achieves a colorimetric match between image "A" and image "B"; wherein image "A" is a motion picture film image that is projected under motion picture viewing conditions using a motion picture print film projection system, and image "B" is a digital image that originated on motion picture film and was transformed to digital domain by scanning the motion picture film, and that is displayed under the same viewing conditions as image "A", using a digital projector.

It is another object of the present invention to provide digital image processing that achieves an appearance match between image "A" and image "C"; wherein image "C" is a digital image, that originated on motion picture film and was transformed to digital domain by scanning the motion picture film, using a motion picture film scanner, and that is projected under different viewing conditions to those of image "A", using a digital projector.

It is another object of the present invention to provide a robust, straightforward method that transforms film originated and scanned digital images for digital projection so that they emulate film projected images, while, at the same time, eliminating the need for any manual adjustments to the color and tone scale of digitized images after the originating film has been adjusted for color and tone to create an acceptable release print.

It is another object of the present invention to implement a robust, straightforward approach to creating a colorimetric match between digital images projected on a digital projector and film images projected on a film projector so that the digitally projected images emulate the film-projected images.

It is another object of the present invention to provide a digital image processing method which can be easily modified to obtain an appearance match between the film-projected image and the digitally projected image when viewing conditions are different.

It is another object of the present invention to provide digital image processing which takes advantages of the color adjustments made when creating a print release film, thereby avoiding any further manual adjustments to the color or tone scale of the images after they have been digitized.

According to a feature of the present invention, scanner density values of a digitized image of an original film are processed so that a projection of the digitized image closely matches that image which a film projector would produce when projecting the original film. A method comprises the steps of transforming the scanner density values to printing density values; digital color balancing by writing the printing density values and a LAD patch onto film; printing the film according to the LAD procedure; transforming the images from device dependent color space values into device independent color space values; carrying out a relationship between the device independent color space and a display device output to obtain RGB code values; adjusting any non-linearity between the RGB code values and the display device output; and scaling the adjusted RGB code values to an appropriate bit depth.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

DETAILED DESCRIPTION OF THE INVENTION

Figure 1:
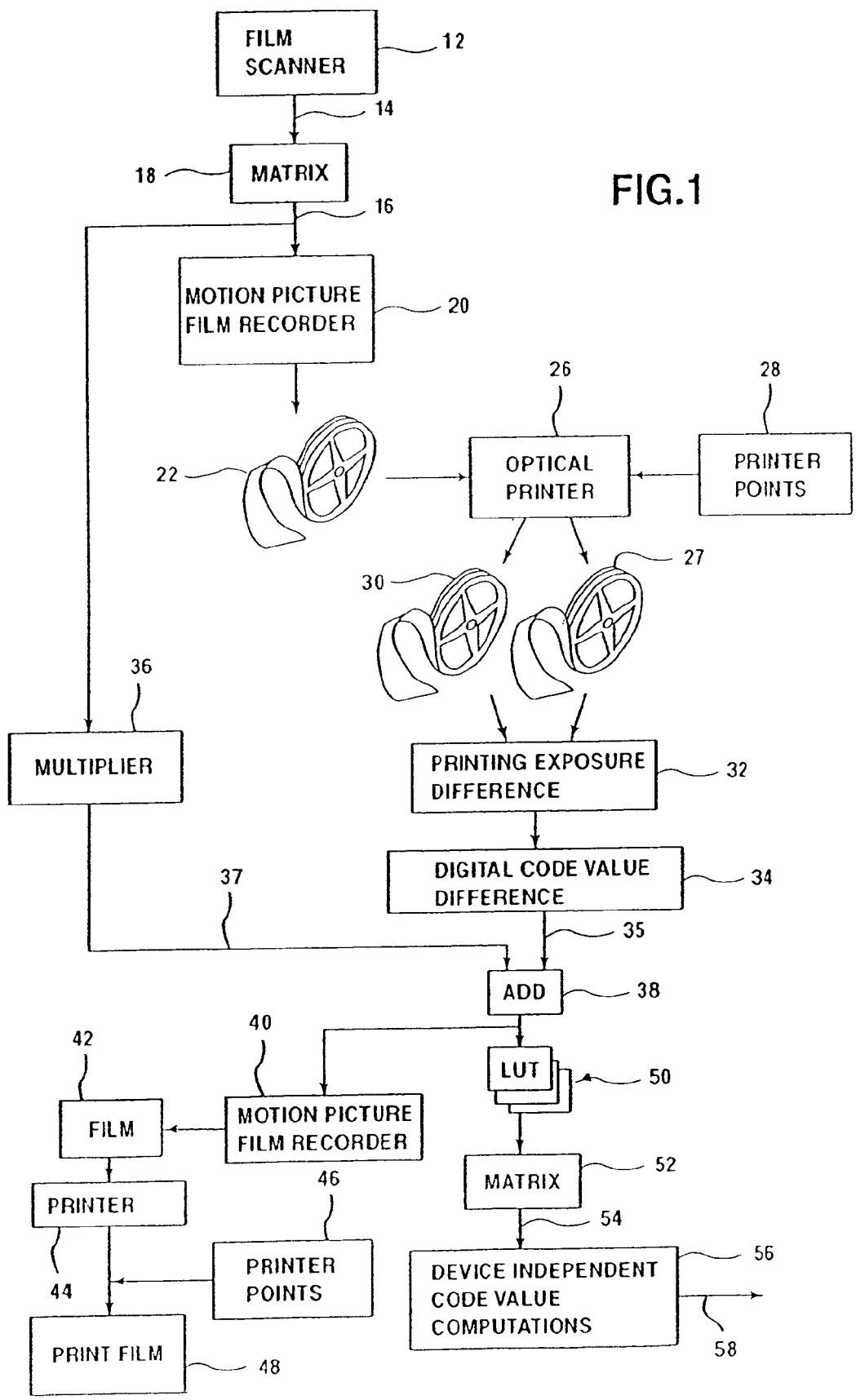
FIG. 1 is a schematic block diagram of a process according to the present invention to go from digitizing the film to device independent color values.

Referring to FIG. 1, film images and a Laboratory Aim Density (LAD) patch are digitized using a motion picture film scanner 12. Utilizing LAD patches is disclosed in SMPTE Journal Volume 85, Oct. 1976, in the article A *Simplified Motion-Picture Laboratory Control Method for Improved Color Duplication*, pages 781–785, by Pytlak and Fleischer. The resulting scanner density values 14 are transformed to printing density values 16 by a matrix 18. The matrix may be obtained by regression between scanner density values and corresponding printing density values, a well know mathematical procedure to those skilled in the art. The use of one-dimensional Look-Up Tables (LUTs) is also available for this transformation. The scanner density and printing density terms are defined in the text *Digital Color Management*, by Giorgianni and Madden, pages 448–457.

After matrixing at 18, digital color balancing is carried out. Just as optical color balancing enhances color reproduction and overall density for conventionally printed images, digital color balancing enhances color reproduction and overall density when digital data is written to film and subsequently printed. Digital color balancing is effected by writing the transformed film images and LAD patch onto film 22 using a motion picture film recorder 20. The procedure of digitally recording images that originate on film is documented in SMPTE Journal Volume 102, Dec. 1993, in the article *Gray-Scale Transformations of Digital Film Data for Display, Conversion, and Film Recording*, by Kennel and Snider.

Digitally recorded motion picture negative film 22 is conventionally printed at 26 onto motion picture print film 27 according to the LAD procedure; thus creating a "LAD Print." A discussion of printing of motion picture films is given in EASTMAN Professional Motion Picture Films, Kodak Publication H-1 (CAT 155 2280, 12-92-E Major Revision, Library of Congress Catalog Card No. 91-77432, ISBN 0-87985-477-4), pages 80–90.

The red, green, and blue light values in an additive printer can be adjusted by values, called "printer points" (also referred to in the art as "printer lights" in the Pytlak and Fleischer article). The printer points are integers from one to fifty, and are fed into printer 26 from a source 28 by perforated paper tape, and are recorded on the film. A change of one printer point is equivalent to a change to the print film of 0.025 logE. A description of printer points is given on pages 88–89 of publication H-1, supra. Therefore, the operator of the printer always knows or can read from the paper tape the printer points used during the printing of any film.

Digitally recorded motion picture negative film 22 is also printed onto motion picture print film 30 to obtain a "Best Print." Experienced printing technicians (color-timers) carry out this step. Again, the printer points are recorded.

A Printing Exposure Difference value is determined at 32 from the printer points. The Printing Exposure Difference value is equal to 0.025 times the difference between the Printer Points recorded on LAD Print 27 and the Printer Points recorded on Best Print 30. At 34, the Printing Exposure Difference value is multiplied by 12.5 to give a Digital Code Value Difference 35.

A multiplier 36 determines a Film Image Code value 37 as the product of 500 times Printing Density values 16. At an Adder 38, Digital Color Balanced Code Values 39 are calculated by adding Digital Code Value Difference 35 to the Film Image Code values 37. This allows the images to be printed according to the LAD procedure and at the same time to be the best prints. Coming off Adder 38, Digital Color Balanced Code values are inputted to a Motion Picture Film Recorder 40 that is identical to Motion Picture Film Recorder 18. Recorder 40 writes the digital images and LAD patch onto a film 42. Film 42 is printed, using a conventional printer 44 with printer points from a source 46, to make a film print 48. This printing operation can be done using the LAD procedure. Because of the steps from 18 through 38, print 48 is also the best print. Although the steps 18 through 48 may seem like overly complex steps, they are relatively easy to perform, the "rules" to perform them are well known in the motion picture industry, and the result is the best print in a straightforward way. In film labs that print motion picture film, the LAD procedure is well-established. In addition, the Digital Color Balanced Code Values out of Adder 38 from different scenes of a movie can be digitally intercut with confidence that when the resulting movie is shown (whether by following steps 40 through 48 or by following a digital projection route following step 48 ) all of the scenes will be optimum for color and density.

The Digital Color Balanced Code Values from Adder 38 are also transformed to a set of analytical density values by a set of three one-dimensional LUTs 50. These LUTs are determined from the characteristic curve, also known as the D-logE curve, of the print film material. The characteristic curve can be plotted as measured density on the y-axis and Code Value on the x-axis, where Code Value=500*Printing Density.

The characteristic curve is normally measured as an integral density curve, for example, a "Status A Density" curve. Status A density is also known as integral density, and is a measure of the light absorbing power of a material. In film, the individual components absorbing the light are the base, the gelatin, the cyan dye, the magenta dye, the yellow dye, and any other absorbing materials in the film. The base, the gelatin, and the other absorbing materials usually absorb a constant fraction of the light independent of the amount of cyan, magenta, or yellow dyes. The cyan dye absorbs primarily red light, but also absorbs some green and some blue light. The magenta dye absorbs primarily green light, but also absorbs some red and blue light. The yellow dye absorbs primarily blue light, but also absorbs some red and green light. In order to calculate the color of any patch, it is important to know the amount of each dye in the patch. Analytical densities are proportional to the amounts of the dyes, not to the absorbing properties of the dyes. Therefore, a characteristic curve that shows the relationship between the analytical densities (y-axis) and the code values (x-axis) is more useful than a characteristic curve that shows the Status A densities (y-axis) and the code values (x-axis). For a description of printing density, integral density, analytical density, and conversions among them, see *The Theory of The Photographic Process*, by T. H. James, pages 517–535).

The necessity for inter-image effects corrections will depend on how the motion picture print film behaves. In order to know if it is necessary to make a correction for inter-image effects, it is necessary to measure the print film. An experiment to run is described in the James book on page 534. Briefly, the film is exposed through a step tablet with one color light (red, green, or blue light). Next, the film is given a uniform exposure with the other two light colors. The film is processed, and the Status A densities are measured. The Status A densities are converted to analytical densities, and the analytical densities are plotted against the code values as explained above. The analytical densities corresponding to the dye associated with the light exposure through the step tablet will show variation from a low value to a high value. If there are no inter-image effects in the film, the other two analytical densities will be constant, and they will not have changed with the changes in the other dye. If there are inter-image effects in the film, the other two analytical densities will either increase or decrease, and they will have changed with the changes in the other dye. If necessary, a correction for inter-image effects is applied by a matrix 52 to produce inter-image effects corrected Analytical Density values 54. The result of that matrix multiplication is a mathematical modeling of the chemical inter-image effects in the film. If there are no inter-image effects, matrix 52 is a unity matrix, and the set of three one-dimensional LUTs 50 and matrix 52 can be combined into a set of three one-dimensional LUTs creating a direct relationship between printing density and analytical densities formed on the motion picture print film.

Dye set curves describe the spectral density curves of the imaging dyes in the film. Normalized dye set curves describe the spectral density curves of the imaging dyes in the film for a neutral reference. The spectral curve $D(\lambda)$ for any color patch can be calculated from the equation:

$$D(\lambda)=c^*C(\lambda)+m^*M(\lambda)+y^*Y(\lambda)+D\min(\lambda)$$

where, $C(\lambda)$, $M(\lambda)$, and $Y(\lambda)$ are respectively the spectral density distributions of the cyan, magenta, and yellow dyes as a function of wavelength $\lambda$; and c, m, and y are respectively the analytical density values of the cyan, magenta, and yellow dyes.

Thus, the c, m, and y analytical density values are used to modulate at 56 appropriately normalized print film dye set curves. Modulating these curves according to the analytical densities produces the spectrum, in density space, of the image formed in the motion picture print film. The density spectrum is then transformed to linear (transmittance) space to compute the device independent color values 58. The equation to go from density to transmittance is:

$$T(\lambda)=10.0^{(-D(\lambda))}$$

This is all effected in software, but could be implemented in hardware.

It is possible to specify a color on a color monitor by specifying the drive values (code values) for the primaries of the monitor. However, these numbers depend on what the primaries are. If a person uses a different monitor with different primaries, a different set of code values are needed. An objective of the present invention is to express the color patch in device independent color values 58. That is, the color of the patch is specified by a set of numerical values that are independent of the device producing the colors. CIE XYZ (tristimulus) values are one such set of numbers. There are other numbers that could be used, for example CIELab coordinates, CIELuv coordinates, CIE x, y, Y coordinates, CIE u', v', Y coordinates, etc. The tristimulus values are defined as follows:

$$X = k \sum_{\lambda-visual} Illum(\lambda) \cdot Optics(\lambda) \cdot \bar{x}(\lambda) \cdot Trans(\lambda)$$

$$Y = k \sum_{\lambda-visual} Illum(\lambda) \cdot Optics(\lambda) \cdot \bar{y}(\lambda) \cdot Trans(\lambda)$$

$$Z = k \sum_{\lambda-visual} Illum(\lambda) \cdot Optics(\lambda) \cdot \bar{z}(\lambda) \cdot Trans(\lambda)$$

where:

Illum($\lambda$) is the light source power spectrum,

Optics($\lambda$) represents the net spectra of any optical elements in the viewing path between the light source and the human eye, $\bar{x}(\lambda)\bar{y}(\lambda)\bar{z}(\lambda)$ are the CIE 2° standard observer Color Matching Functions, Trans($\lambda$) is the transmittance spectrum of the object imaged in the motion picture print film, and k is a normalizing constant that makes Y equal to 100 for a 100% white reference.

If a piece of white paper is viewed in one illuminant, say D50, it will appear white. If the same piece of white paper is viewed in another illuminant, say D65, it will again appear white. The eyes adapt to the illuminant such that a white appears white under most illuminants. Yet the XYZ tristimulus values will be different for the same piece of white paper in the two different illuminants. Although the XYZ values give a unique definition of color, this is only true relative to the illuminant. One therefore needs to modify the XYZ values for any shift in illuminants. Once device independent color space values 58 are obtained, any type of chromatic adaptation function can be applied to them. One example of this would be a VonKries chromatic adaptation, which is also documented in the text *Digital Color Management*, by Giorgianni and Madden, pages 479–481. The VonKries adaptation method is well known and works well for the types of illuminant changes one might encounter in a motion picture environment. There are other adaptation equations. The form of a VonKries adaptation equation is:

$$\begin{bmatrix} X' \\ Y' \\ Z' \end{bmatrix} = [M] \cdot \begin{bmatrix} X \\ Y \\ Z \end{bmatrix}$$

where X', Y' and Z' are the chromatically adapted tristimulus values and M is the chromatic adaptation matrix. Giorgianni and Madden goes through an example of how to calculate M.

In some implementations it will be reasonably fast to go through all of the calculations just described above for each pixel in the image. However, for other applications, to calculate each pixel by the above equations for each image will be too slow. Therefore, a faster implementation is needed. One faster alternative implementation can be a three-dimensional LUT (not shown). The three-dimensional LUT can be implemented in hardware and will provide very fast implementation of what we have described. The three-dimensional LUT values can be calculated using the above-described technique.

Figure 2:
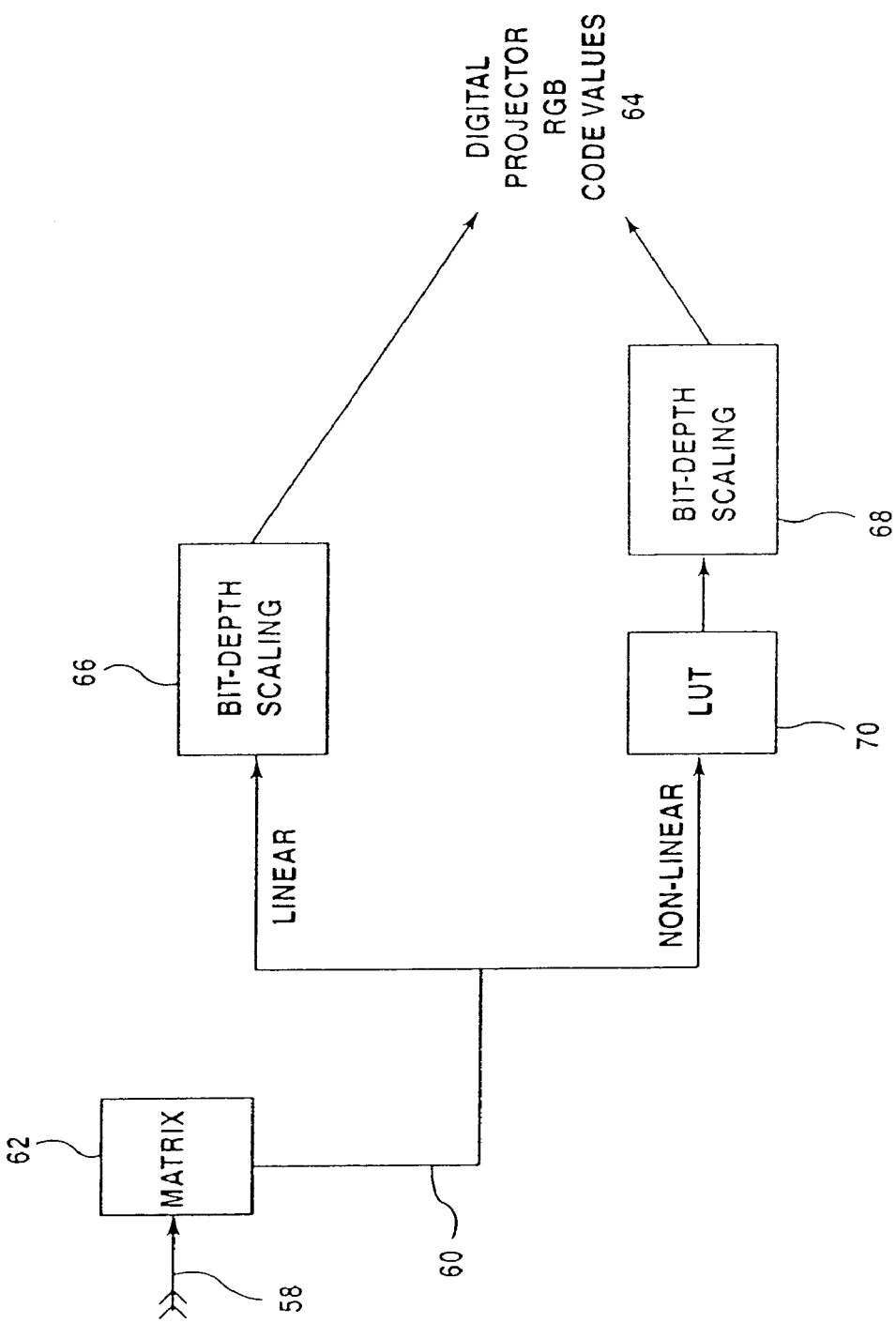
FIG. 2 is a schematic block diagram of the process according to the present invention to go from device independent color values to a digital projector's RGB code values.

Referring to FIG. 2, it is necessary to create a relationship between the device independent color space values 58 and RGB code values 60 for the display device, for example a digital projector. The relationship between device independent color space values and RGB code values for the display device can be characterized by a matrixing operation 62. For an example of such a procedure see the report by the BBC Research and Development titled *Television Colorimetry: A Tutorial for System Designers* (BBC RD 1995/9), by Roberts. The following equation shows matrixing operation 62:

$$\begin{bmatrix} R \\ G \\ B \end{bmatrix} = [M] \cdot \begin{bmatrix} X \\ Y \\ Z \end{bmatrix}$$

where the XYZ vector represents the CIE XYZ tristimulus values associated with a set of RGB linear drive values, and M is matrix 62 used for the transformation.

If the relationship between the light emitted by an intended display device 64 is linearly related to RGB code values 60, then the RGB code values computed by matrixing operation 62 are the values inputted to the digital display device, scaled up to the appropriate bit depth at 66. If the relationship between the light emitted by an intended display device 64 is non-linearly related to RGB code values 60, then the RGB code values computed by matrixing operation 62 need to be adjusted by a transformation that characterizes the non-linear relationship before the code values are scaled up to the appropriate bit depth at 68. The transformation that characterizes the non-linear relationship can be implemented, as an example, with a one-dimensional LUT 70. It is important to mention that for a DLP (Digital Light Processing) digital projector, the inherent relationship between RGB code values 60 and light output is linear, but the hardware provides for a non-linear setting. This is to compensate for previously corrected video signals that were tailored for phosphor based display devices, which have an inherent non-linear relationship between RGB code values and light output. This is documented in the SPIE Proceedings Vol. 2666 paper, *Video Processing for DLP Display Systems*, by Markandey, Clatanoff and Pettitt of Texas Instruments, Inc.

Figure 3:
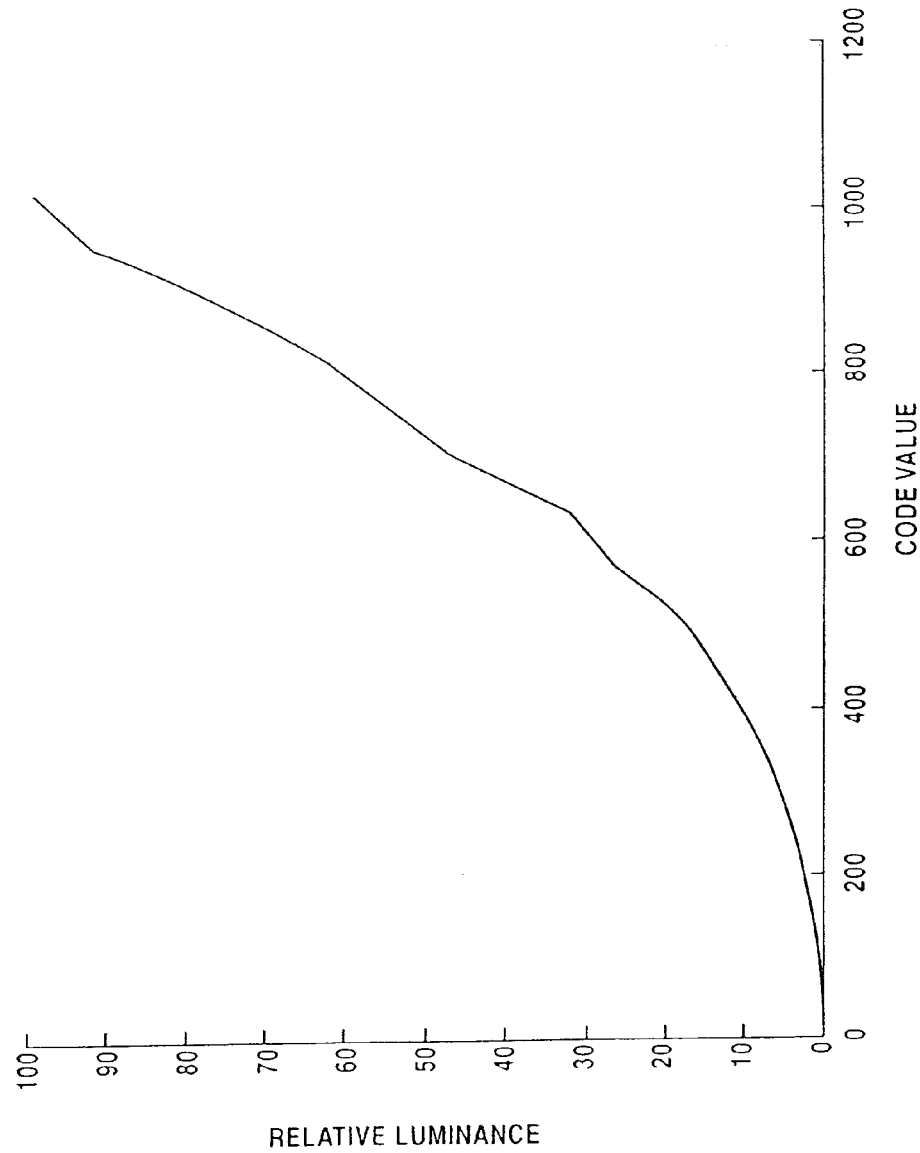
FIG. 3 shows one transfer function curve relationship for a digital projector.

Any type of dark surround adaptation or flare corrections can be applied to the RGB code values 60 for display device 64 if the illumination levels or dark surround conditions where the display device is located do not match those conditions where traditional motion picture print film is viewed. These corrections are also documented in the text *Digital Color Management*, by Giorgianni and Madden, pages 474–478 and 484–488. FIG. 3 shows, as an example, one transfer function curve relationship for the digital projector.

Finally, the processed images are projected under motion picture viewing conditions, according to the Society of Motion Picture and Television Engineers (SMPTE) standards, sending the data to the display device in full RGB resolution.

The invention has been described in detail with particular reference to preferred embodiments thereof, but it will be understood that variations and modifications can be effected within the spirit and scope of the invention.

What is claimed is:

1. A method of processing scanner density values of a digitized image of an original film image such that a projection of the digitized image closely matches an image which a film projector would produce using a positive print of the original film image; said method comprising the steps of:
   transforming the scanner density values to printing density values;
   digital color balancing by writing the printing density values and a reference patch onto a first film;
   printing the first film with the reference patch onto a second film according to a predetermined printing procedure;
   transforming the digitized images from device dependent color space values into device independent color space values;
   carrying out a relationship between the device independent color space values and a display device output to obtain RGB code values;
   adjusting any non-linearity between the RGB code values and the display device output; and
   scaling the adjusted RGB code values to a desired bit depth.

2. A method as set forth in claim 1, further comprising the step of obtaining the scanner density values by using a motion picture film scanner.

3. A method as set forth in claim 1, wherein the device independent color space values are CIE XYZ color space values.

4. A method as set forth in claim 1, wherein the device dependent color space values are printing density values.

5. A method as set forth in claim 1, wherein the transformation into the device independent color space values is implemented by a series of one-dimensional LUTs (Look-Up Tables) and matrices.

6. A method as set forth in claim 1, wherein the transformation into the device independent color space values is implemented by a three-dimensional LUT.

7. A method as set forth in claim 1, wherein the transformation into the device independent color space values describes a linear relationship between the device dependent color space values and the device independent color space values.

8. A method as set forth in claim 1, wherein the transformation into the device independent color space values describes a non-linear relationship between the device dependent color space values and the device independent color space.

9. A method as set forth in claim 1, further comprising the step of applying a chromatic adaptation function to the device independent color space values.

10. A method as set forth in claim 9, wherein the chromatic adaptation function applied to the device independent color space values is a VonKries chromatic adaptation.

11. A method as set forth in claim 1, wherein the step of carrying out a relationship between the device independent color space values and a display device output is effected by a matrix transformation between the device independent color values and the RGB code values for the display device.

12. A method as set forth in claim 1, further comprising the step of applying dark surround adaptation to the RGB code values to accommodate illumination levels and dark surroundings that do not match those conditions where traditional motion picture print film is viewed.

13. A method as set forth in claim 1, further comprising the step of applying flare corrections to the RGB code values to accommodate illumination levels and dark surroundings that do not match those conditions where traditional motion picture print film is viewed.

14. A method as set forth in claim 1, wherein the reference patch is an LAD patch.

15. A method as set forth in claim 1, wherein the predetermined printing procedure is an LAD procedure.

16. A method of processing received density values of a digitized image such that a projection of the digitized image closely matches an image which a film projector would produce using a positive print of an original film image; said method comprising the steps of:
   transforming the received density values to printing density values;
   digital color balancing by writing the printing density values and a reference patch onto a first film;
   printing the first film with the reference patch onto a second film according to a predetermined printing procedure;
   transforming the digitized image from device dependent color space values into device independent color space values;
   carrying out a relationship between the device independent color space values and a display device output to obtain RGB code values;
   adjusting any non-linearity between the RGB code values and the display device output; and
   scaling the adjusted RGB code values to an appropriate bit depth.

17. A method as set forth in claim 16, wherein the device independent color space values are CIE XYZ color space values.

18. A method as set forth in claim 16, wherein the device dependent color space values are printing density onto motion picture print film.

19. A method as set forth in claim 16, wherein the transformation into the device independent color space values is implemented by a series of one-dimensional LUTs (Look-Up Tables) and matrices.

20. A method as set forth in claim 16, wherein the transformation into the device independent color space values is implemented by a three-dimensional LUT.

21. A method as set forth in claim 16, wherein the transformation into the device independent color space values describes a linear relationship between the device dependent color space values and the device independent color space values.

22. A method as set forth in claim 16, wherein the transformation into the device independent color space values describes a non-linear relationship between the device dependent color space values and the device independent color space values.

23. A method as set forth in claim 16, further comprising the step of applying a chromatic adaptation function to the device independent color space values.

24. A method as set forth in claim 16, wherein the step of carrying out a relationship between the device independent color space values and a display device output is effected by a matrix transformation between the device independent color values and the RGB code values for the display device.

25. A method as set forth in claim 16, further comprising the step of applying dark surround adaptation to the RGB code values to accommodate illumination levels and dark surroundings that do not match those conditions where traditional motion picture print film is viewed.

26. A method as set forth in claim 16, further comprising the step of applying flare corrections to the RGB code values to accommodate illumination levels and dark surroundings that do not match those conditions where traditional motion picture print film is viewed.

27. A method as set forth in claim 16, wherein the reference patch is an LAD patch.

28. A method as set forth in claim 16, wherein the predetermined printing procedure is an LAD procedure.

* * * * *

UNITED STATES PATENT AND TRADEMARK OFFICE
CERTIFICATE OF CORRECTION

| | | |
|---|---|---|
| PATENT NO. | : 6,985,253 B2 | Page 1 of 1 |
| APPLICATION NO. | : 09/751230 | |
| DATED | : January 10, 2006 | |
| INVENTOR(S) | : Ricardo R. Figueroa et al. | |

It is certified that error appears in the above-identified patent and that said Letters Patent is hereby corrected as shown below:

Title page,
Insert Item:
-- [74] *Attorney, Agent, or Firm*—Stephen H. Shaw --.

Signed and Sealed this

Twenty-seventh Day of June, 2006

JON W. DUDAS
*Director of the United States Patent and Trademark Office*